US009531273B2

(12) United States Patent
Abramov

(10) Patent No.: US 9,531,273 B2
(45) Date of Patent: Dec. 27, 2016

(54) SYNCHRONOUS DC-DC CONVERTERS, AND SYSTEMS AND METHODS OF CONTROLLING SAME

(75) Inventor: Igor Abramov, Woodcroft (AU)

(73) Assignee: REDARC TECHNOLOGIES PTY LTD, Morphett Vale (AU)

( * ) Notice: Subject to any disclaimer, the term of this patent is extended or adjusted under 35 U.S.C. 154(b) by 354 days.

(21) Appl. No.: 14/000,794

(22) PCT Filed: Feb. 21, 2012

(86) PCT No.: PCT/AU2012/000156
§ 371 (c)(1),
(2), (4) Date: Oct. 21, 2013

(87) PCT Pub. No.: WO2012/113015
PCT Pub. Date: Aug. 30, 2012

(65) Prior Publication Data
US 2014/0043004 A1    Feb. 13, 2014

(30) Foreign Application Priority Data
Feb. 22, 2011    (AU) ............... 2011900603

(51) Int. Cl.
G05F 1/00    (2006.01)
G05F 1/565    (2006.01)
H02M 3/158    (2006.01)

(52) U.S. Cl.
CPC ......... H02M 3/1588 (2013.01); Y02B 70/1466 (2013.01)

(58) Field of Classification Search
CPC ............ G05F 1/462; G05F 1/56; G05F 1/563; G05F 1/565; G05F 1/569; G05F 1/571; G05F 1/573; G05F 1/59; G05F 1/595; G05F 1/614

(Continued)

(56) References Cited

U.S. PATENT DOCUMENTS

2004/0008016 A1* 1/2004 Sutardja et al. .............. 323/283
2007/0085520 A1* 4/2007 Ho ....................... H02M 3/1588
323/282

(Continued)

FOREIGN PATENT DOCUMENTS

WO    WO-2007-130533 A2    11/2007
WO    PCT/AU2012/000156    2/2012

OTHER PUBLICATIONS

International Search Report issued by the International Searching Authority on Mar. 15, 2012 for international application PCT/AU2012/000156, filed on Feb. 21, 2012 and published as WO 2012/113015 on Aug. 30, 2012 (Applicant—Redarac Technologies Pty Ltd. // Inventor—Abramov) (3 pages).

(Continued)

Primary Examiner — Adolf Berhane
Assistant Examiner — Gary Nash
(74) Attorney, Agent, or Firm — Ballard Spahr LLP

(57) ABSTRACT

A synchronous DC-DC converter (300) for converting an input voltage ($V_{in}$) into an output voltage ($V_{out}$), the converter having a continuous current operative mode (CCM) and a discontinuous current operative mode (DCM), the converter including: an active switch (302) receiving a first gate signal for turning on the active switch for a first time interval ($T_{q1}$), the first gate signal having a period ($T_{prd}$); a synchronous rectifier (304) receiving a second gate signal for turning on the synchronous rectifier for a second time interval ($T_{q2}$); and a controller (306) for determining an estimation ($T_{q1est}$) for the first time interval, and thereafter comparing the estimation ($T_{q1est}$) with the value of the first time interval ($T_{q1}$); wherein responsive to the comparison the controller (306) determines an operative mode of the converter (300) and controls the second time interval ($T_{q2}$) depending on the determined operative mode.

20 Claims, 10 Drawing Sheets

(58) Field of Classification Search
USPC ................. 323/266, 274, 275, 276, 282–286
See application file for complete search history.

(56) References Cited

U.S. PATENT DOCUMENTS

| | | | |
|---|---|---|---|
| 2008/0203992 A1* | 8/2008 | Qahouq et al. ............... | 323/299 |
| 2009/0322300 A1* | 12/2009 | Melanson et al. ............ | 323/284 |
| 2011/0018516 A1* | 1/2011 | Notman et al. ............... | 323/284 |

OTHER PUBLICATIONS

Written Opinion of the International Searching Authority issued on Mar. 1, 2012 for international application PCT/AU2012/000156, filed on Feb. 21, 2012 and published as WO 2012/113015 on Aug. 30, 2012 (Applicant—Redarac Technologies Pty Ltd. // Inventor—Abramov) (4 pages).

International Preliminary Report issued by the International Searching Authority on Aug. 27, 2013 for international application PCT/AU2012/000156, filed on Feb. 21, 2012 and published as WO 2012/113015 on Aug. 30, 2012 (Applicant—Redarac Technologies Pty Ltd. // Inventor—Abramov) (5 pages).

* cited by examiner

SYNCHRONOUS DC-DC CONVERTERS, AND SYSTEMS AND METHODS OF CONTROLLING SAME

CROSS-REFERENCE TO RELATED APPLICATIONS

The present application is a U.S. National Phase Application of International Application No. PCT/AU2012/000156, filed Feb. 21, 2012, which claims priority to Australian Patent Application No. 2011900603, filed Feb. 22, 2011, all of which applications are incorporated herein fully by this reference.

FIELD OF INVENTION

The present invention relates to DC-DC conversion devices and methods which involve synchronous rectification. In a typical application, an embodiment of the present invention may be used in synchronous DC-DC converter, such as a synchronous buck converter, a synchronous boost converter, or combinations thereof.

BACKGROUND

The use of DC-DC power converters is becoming increasing widespread in electrical products, such as portable computers and mobile devices. In many cases, the performance of the product depends on the efficiency of the power converter. Because of this dependency, product manufacturers are demanding more efficient converters, for example, to preserve battery life or improve another performance aspect.

Generally, two types of general schemes may be used for DC-DC converters, namely, non-synchronous and synchronous converters.

FIG. 1 shows a simplified schematic diagram for a non-synchronous buck converter 100. The illustrated converter 100 includes a FET 102 (labelled as Q1), such as a MOSFET, a diode 104 (typically a Schottky diode), an inductor 106 (L), a capacitor 108 (C) and a load 110 (R). The FET 102 and the diode 104 act as switches with the FET 102 receiving a pulse width modulated (PWM) gate signal 112. The PWM signal 112 is controlled to turn the FET 102 "on" and "off" to regulate the output voltage ($V_{out}$). When the FET 102 is turned on the Schottky diode 104 is reversed biased. In this configuration energy is delivered from an input voltage source to the inductor 106 and the load 110. On the other hand, when the FET 102 is turned off, energy stored in the inductor 106 is discharged and the resultant inductor current I(L) is conducted via the Schottky diode 104, which is forward biased. In operation, the output voltage ($V_{out}$) of the illustrated converter 100 is maintained by controlling the duty cycle of the PWM signal 112 to provide a wider pulse signal to the FET 102 when the output voltage ($V_{out}$) is less than a reference voltage ($V_{ref}$), or providing a narrower pulse signal to the FET 102 when the output voltage ($V_{out}$) exceeds the reference voltage ($V_{ref}$). In this respect, in the example shown in FIG. 1, providing a wider pulse signal to the FET 102 increases the energy delivered to the load 110 from the inductor (L) 106, and thus increases the output voltage ($V_{out}$), whereas providing a narrower pulse signal to the FET 102 reduces the energy delivered to the load 110 from the inductor 106, and thus reduces the output voltage ($V_{out}$). The capacitor 108 is provided to decrease output voltage ripple.

Non-synchronous converters provide relatively efficient operation when the load demands a relatively high current and high output voltage ($V_{out}$). However, when the load (R) demands no or low current, a non-synchronous converter may operate in a low voltage condition or mode. In this condition, the forward voltage drop of the diode 104, which is typically not less than 0.3V, will reduce the efficiency of the converter, particularly at low output voltages as the relative proportion of the forward voltage drop across the diode increases compared to the output voltage ($V_{out}$).

In a synchronous converter the diode is replaced by a FET, such as a MOSFET to provide a synchronous rectifier (SR) having a low "on" resistance ($R_{DSON}$). When a MOSFET is turned on it thus provides a voltage drop which is less than that of the diode at a given current. Furthermore, the "on" resistance ($R_{DSON}$) of FETs can be lowered, either by increasing the size of the die or by paralleling discrete devices. Consequently, a MOSFET used in place of a diode may provide a significantly smaller voltage drop at a given current compared to a diode. This reduced voltage drop may improve the efficiency of synchronous rectification, which may be beneficial in applications sensitive to efficiency, converter size, and thermal performance, such as portable or handheld devices. Furthermore, since MOSFET manufacturers are constantly introducing new MOSFET technologies that have lower $R_{DSON}$ and total gate charge (QG), further efficiency improvements may be possible which may make it easier to implement synchronous rectification in power converter design and lead to further efficiency improvements.

FIG. 2A depicts, for illustrative purposes, a simplified schematic diagram for a synchronous "buck" converter 200 for converting an input voltage ($V_{in}$) to a lower output voltage ($V_{out}$). In this example, the FET 202 (Q1) is turned on for a sufficient duration to energise the inductor 204 (L1) to meet the current demand by the load 206 (R). The FET 208 (Q2) replaces the diode 104 depicted in FIG. 1. In this example, the FET 208 provides a synchronous rectifier which provides a switched conduction path which is controlled by, and thus depends on, a second gate signal (labelled as 'Q2 Gate Signal'). In operation, the inductor current I(L) increases linearly when Q1 is turned on (and Q2 is switched off) and decreases linearly when Q1 is switched off (and Q2 is switched on).

A synchronous converter such as of the type depicted in FIG. 2A may operate in one of two modes, namely, a continuous current mode (CCM) or a discontinuous current mode (DCM). In relation to the converter 200 shown in FIG. 2A, in continuous current mode when Q1 is turned off the inductor current I(L) does not decrease to zero, but instead continues to flow in one direction at all times. On the other hand, in discontinuous current mode, which may occur during low load current demand, the inductor current I(L) is interrupted and indeed may be become negative at some point, thus contributing to a reduction in conversion efficiency.

FIG. 2B shows a signal timing diagram illustrating the timing relationship between the Q1 gate signal (labelled as "Q1 gate signal"), the Q2 gate signal (labelled as "Q2 gate signal") and the inductor current I(L) during operation of the converter shown in FIG. 2 in discontinuous current mode. As shown in FIG. 2B, when operating in DCM it is possible for the inductor current I(L) to reverse direction, and thus become negative (region shown shaded), if the Q2 gate signal maintains FET Q2 in the on state after the inductor (L) has discharged the energy stored by the inductor (L) when the Q1 gate signal held Q1 on.

In view of the above, a problem which may arise during operation of a synchronous converter as compared to operation of non-synchronous converter are losses in efficiency which may arise due to the synchronous rectifier (i.e. Q2) permitting negative inductor current. Ideally, the synchronous rectifier should be capable of emulating the diode in the non-synchronous converter and inhibit the current exactly at the "zero current point" to thereby prevent negative current through the inductor.

One prior art approach for mitigating the negative current problem which may occur during discontinuous current mode involves detecting the inductor current and inhibiting or shutting off the gate signal to the synchronous rectifier when the polarity of the inductor current I(L) changes. However, such an approach may require additional sensing elements which could themselves introduce undesirable signal noise and additional efficiency losses.

Another approach for improving the operation of a synchronous rectifier during discontinuous current mode is described in US 2009/0323375. One approach described in US 2009/0323375 attempts to regulate a synchronous rectifier by monitoring the average duty cycle of the PWM control signal to determine the effect of varying a reference voltage (Vref) on the duty cycle to establish when a minimum duty cycle condition exists for the PWM control signal. This approach thus involves a trial and error process which relies on the load remaining unchanged for the duration of the regulation. However, if the load changes suddenly, the regulation may need to be reset or restarted from an unknown, and therefore not optimal, point.

It would be desirable to provide an efficient and low loss circuit and method for controlling a synchronous rectifier.

The discussion of the background to the invention herein is included to explain the context of the invention. This is not to be taken as an admission that any of the material referred to was published, known or part of the common general knowledge as at the priority date of any of the claims.

SUMMARY OF INVENTION

According to one aspect of the present invention there is provided a synchronous DC-DC converter for converting an input voltage ($V_{in}$) into an output voltage ($V_{out}$), the converter having a continuous current operative mode (CCM) and a discontinuous current operative mode (DCM), the converter including:

an active switch receiving a first gate signal for turning on the active switch for a first time interval ($T_{q1}$), the first gate signal having a period ($T_{prd}$);

a synchronous rectifier receiving a second gate signal for turning on the synchronous rectifier for a second time interval ($T_{q2}$); and a controller for determining an estimation ($T_{q1est}$) for the first time interval, and thereafter comparing the estimation ($T_{q1est}$) with the value of the first time interval ($T_{q1}$);

wherein responsive to the comparison the controller determines an operative mode of the converter and controls the second time interval ($T_{q2}$) depending on the determined operative mode.

Another aspect of the present invention provides a method of controlling a synchronous converter for converting an input voltage ($V_{in}$) into an output voltage (Vout), the converter having a continuous current operative mode (CCM) and a discontinuous current operative mode (DCM), the converter including an active switch receiving a first gate signal for turning on the active switch for a first time interval ($T_{q1}$), the first gate signal having a period ($T_{prd}$), and a synchronous rectifier receiving a second gate signal for turning on the synchronous rectifier for a second time interval ($T_{q2}$), the method including:

determining an estimation ($T_{q1est}$) for the first time interval;

comparing the estimation ($T_{q1est}$) with the value of the first time interval ($T_{q1}$);

determining an operative mode of the converter depending on the comparison; and controlling the second time interval ($T_{q2}$) depending on the determined operative mode.

A further aspect of the present invention provides a controller for a synchronous DC-DC converter for converting an input voltage (Vin) into an output voltage (Vout), the converter having a continuous current operative mode (CCM) and a discontinuous current operative mode (DCM), the converter including an active switch and a synchronous rectifier, the controller including:

a first output providing a gate signal for turning on the active switch for a first time interval ($T_{q1}$), the first gate signal having a period ($T_{prd}$);

a second output providing a second gate signal for turning on the synchronous rectifier for a second time interval ($T_{q2}$); and a processing unit for determining an estimation ($T_{q1est}$) for the first time interval and comparing the estimation ($T_{q1est}$) with the value of the first time interval ($T_{q1}$);

wherein responsive to the comparison the processing unit determines an operative mode of the converter and controls the second time interval ($T_{q2}$) depending on the determined operative mode.

Yet another aspect of the present invention provides a programmed device including a processor and set of program instructions in the form of a software program resident in memory, the program instructions executable by the processor to control a synchronous converter for converting an input voltage ($V_{in}$) into an output voltage ($V_{out}$), the converter having a continuous current operative mode (CCM) and a discontinuous current operative mode (DCM), the converter including an active switch receiving a first gate signal for turning on the active switch for a first time interval ($T_{q1}$), the first gate signal having a period ($T_{prd}$), and a synchronous rectifier receiving a second gate signal for turning on the synchronous rectifier for a second time interval ($T_{q2}$), wherein the program instructions are executable by the processor to cause the processor to:

determine an estimation ($T_{q1est}$) for the first time interval;

compare the estimation ($T_{q1est}$) with the value of the first time interval ($T_{q1}$);

determine an operative mode of the converter depending on the comparison; and control the second time interval ($T_{q2}$) depending on the determined operative mode.

In a further aspect of the present invention there is provided a controller for controlling a synchronous DC-DC converter, the converter having a continuous current operative mode (CCM) and a discontinuous current operative mode (DCM), the converter including an active switch receiving a first gate signal for turning on the active switch for a first time interval ($T_{q1}$), the first gate signal having a period ($T_{prd}$), and a synchronous rectifier coupled receiving a second gate signal for turning on the synchronous rectifier for a second time interval ($T_{q2}$), the controller including: a processing unit for determining an estimation ($T_{q1est}$) for the first time interval ($T_{q1}$), and thereafter comparing the estimation ($T_{q1est}$) with the value of the first time interval ($T_{q1}$);

wherein responsive to the comparison the controller determines an operative mode of the converter and controls the second time interval ($T_{q2}$) depending on the determined operative mode.

An advantage of the embodiments of the present invention is that the operative mode of the synchronous converter may be determined without monitoring or sensing the inductor current I(L) or the voltage ($V_{sw}$) across the synchronous rectifier. Such additional sensing may require additional hardware elements, such as one or more additional sensors, which may contribute to undesirable delays or efficiency losses. Hence, embodiments of the present invention may provide improved operating efficiency and signal noise characteristics.

BRIEF DESCRIPTION OF THE DRAWINGS

The present invention will now be described in relation to various examples illustrated in the accompanying drawings. However, it must be appreciated that the following description is not to limit the generality of the above description.

In the drawings.

DETAILED DESCRIPTION OF AN EMBODIMENT

The following description describes embodiments of the present invention with particular reference to a synchronous buck converter and a synchronous boost converter. However, it will be appreciated that the description of the particular examples is non-limiting. Indeed, embodiments of the present invention may be applied to any DC-DC converter which includes a synchronous rectifier, such as multi-stage converters (for example, buck-boost, or boost-buck synchronous converters), secondary-side converters, and flyback synchronous converters.

Example 1

Synchronous Buck Converter

Figure 1:
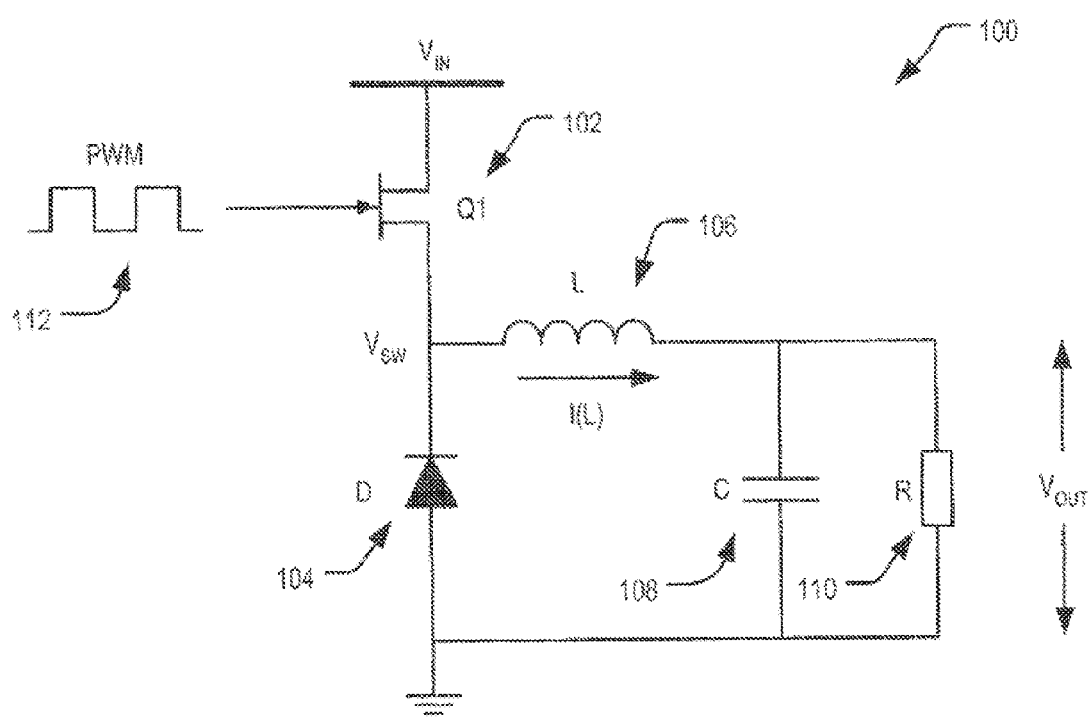
FIG. 1 is a simplified schematic diagram of a conventional non-synchronous buck converter.
Figure 2A:
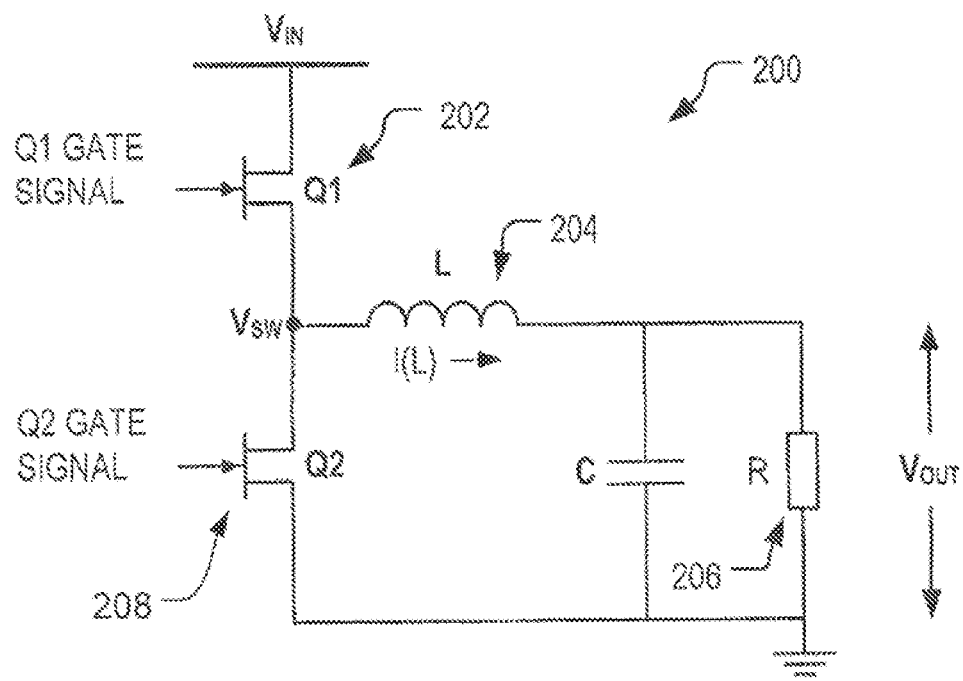
FIG. 2A is a simplified schematic diagram of a conventional synchronous buck converter.
Figure 2B:
FIG. 2B is a timing diagram illustrating a timing relationship between signals for the converter shown in FIG. 2A when operating in DCM.
Figure 2B:
Figure 2B:
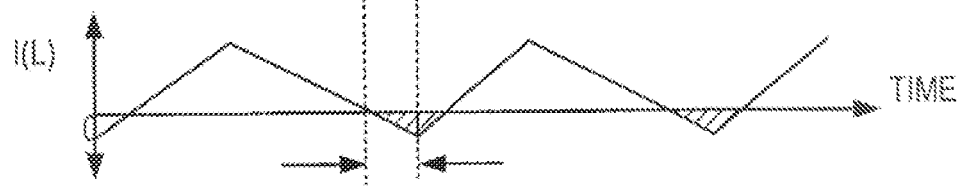
Figure 3:
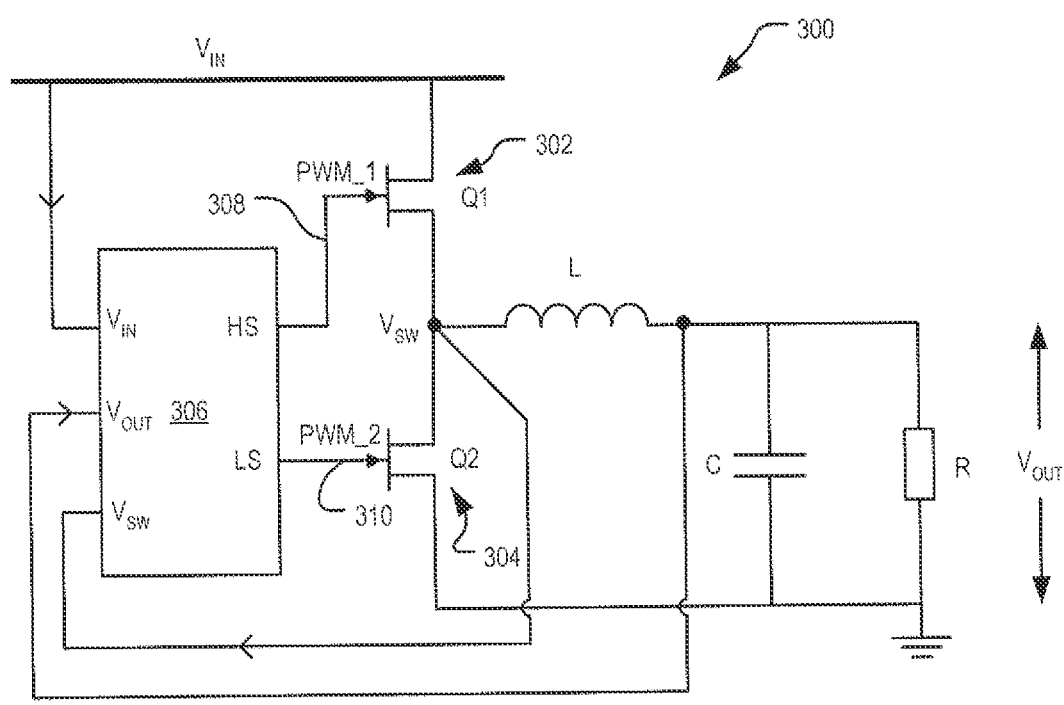
FIG. 3 is a simplified schematic diagram of a synchronous buck converter according to an embodiment of the present invention.

Referring initially to FIG. 3 there is shown a simplified schematic diagram of a synchronous DC-DC buck converter 300 according to an embodiment. As will be understood by a skilled reader, in operation a buck converter converts an input voltage ($V_{in}$) into an output voltage ($V_{out}$) less than the input voltage ($V_{in}$).

The illustrated converter 300 includes an active switch 302 (labelled as Q1), a synchronous rectifier 304 (labelled as Q2), and a controller 306. The active switch 302 and the synchronous rectifier 304 may include MOSFET devices having a low on-resistance ($R_{DSON}$), a low gate charge, and suitable current and voltage ratings for the intended application. Selection of suitable MOSFET devices would be well within the knowledge of a person skilled in the art. The converter 300 also includes an inductor (L) and a capacitor (C) forming a circuit configuration for providing the output voltage ($V_{out}$) to a load (R). The function and selection of the inductor (L), capacitor (C) and the load (R) would also be well understood by a person skilled in the art.

The gate of the active switch 302 (Q1) is coupled to a first control input 308 which provides a first gate signal (PWM_1) for alternatively turning the active switch "on" and "off" for respective time intervals. The first gate signal (PWM_1) is a pulse width modulated signal (PWM) having a duty cycle controllably varied by the controller 306 to maintain the output voltage ($V_{out}$) at a desired level, with the duty cycle being the ratio of the "turned on" time, being a first time interval ($T_{q1}$), and the period ($T_{prd}$) of the first gate signal (PWM_1). For each period ($T_{prd}$) of the first gate signal (PWM_1), the first time interval ($T_{q1}$) corresponds to the pulse width of a pulse used to turn on the active switch 302 in that period ($T_{prd}$). Techniques for controlling the duty cycle of the first gate signal (PWM_I) to convert an input voltage ($V_{in}$) into a desired output voltage ($V_{out}$) using a buck converter configuration would be within the knowledge of a skilled reader.

The gate of the synchronous rectifier 304 (Q2) is coupled to a second control input 310 which provides a second gate signal (PWM_2) for alternatively turning the synchronous rectifier 304 "on" and "off" for respective time intervals. In the present case, the second gate signal (PWM_2) is a pulse width modulated signal having a duty cycle which is controllably varied by the controller 306 using a control algorithm which will be described in more detail following. In this instance, it will be appreciated that the duty cycle of the second gate signal (PWM_2) is the ratio of the "turned on" time of the synchronous rectifier 304, being a second time interval ($T_{q2}$), and the period ($T_{prd}$) of the second gate signal (PWM_2). For each period ($T_{prd'}$) of the second gate signal (PWM_2), the second time interval ($T_{q2}$) corresponds to the pulse width of a pulse used to turn on the synchronous rectifier 304 within that period ($T_{prd'}$).

The second gate signal (PWM_2) is controlled so that the active switch 302 and the synchronous rectifier 304 have non-overlapping "turned on" or conduction times.

During operation, when the first gate signal (PWM_1) is activated to turn on the active switch 302 during the first time interval ($T_{q1}$), a conduction path is provided which includes the input voltage ($V_{in}$) source, the inductor (L), the capacitor (C) and the load (R). This conduction path permits the inductor (L) to store energy attributable to current through the inductor, which current increases in a linear manner whilst the active switch 302 remains turned on. During first time interval ($T_{q1}$), the second gate signal (PWM_2) maintains the synchronous rectifier 304 in a turned off state to inhibit the synchronous rectifier 304 from conducting. When the first gate signal (PWM_1) is controlled to turn off the active switch 302, the input voltage ($V_{in}$) source is isolated from the inductor (L) and the second gate signal (PWM_2). During this time the second gate signal (PWM_2) is activated to turn on the synchronous rectifier 304 to thereby provide a conduction path which permits the inductor (L) to discharge the stored energy by providing current to the load (R), which current decreases in a linear manner whilst the synchronous rectifier 304 remains turned on.

Activation of the second gate signal (PWM_2) to turn on the synchronous rectifier 304 is substantially synchronous with the second gate signal (PWM_2) turning off the active switch 302. A slight delay in the activation of the second gate signal (PWM_2) may be provided to ensure that the synchronous rectifier 304 and the active switch 302 are not turned on at the same time.

In the present example, and as will be explained in more detail following, control of the signal timing of the second gate signal (PWM_2) is regulated by the controller 306 to control the duration of the second time interval ($T_{q2}$) depending on the operative mode of the converter 300 by controlling the timing of the instant at which the synchronous rectifier 304 is turned off.

The controller 306 may include a programmed device, such as a microcontroller programmed with a set of program instructions. One example of a suitable controller includes a 16-bit RISC based CPU with 40 MHz internal frequency, 10-bit analogue to digital converters (ADC) with 300 nSec conversion time, 8 kB ROM, 0.5 kB RAM, and PWM outputs directly driven with 10-bit resolution. Another example of a suitable controller includes a TMS320F28027 microcontroller, with 60 MHz internal frequency, PWM channels for direct gate signals, and 12 bit ADC with 300 nSec conversion time.

In other embodiments, the controller 306 may include an application specific integrated circuit (ASIC), a micro-controller, a processor module, a programmed logic device (such as a PAL, GAL, CPLD, FPGA), or the like. The controller 306 may include on-board memory for storing set of program instructions, or alternatively, the set of program instructions may be stored in a separate external memory device which is addressable by the controller 306. Suitable external memory devices may include, for example, a PROM, EPROM, EEPROM, or FLASH memory device, or the like. Other suitable memory devices would be known to a skilled addressee.

In the present case, the controller 306 includes inputs for periodically and substantially simultaneously sensing values of the input voltage ($V_{in}$), the output voltage ($V_{out}$), and the voltage across the synchronous rectifier 304 ($V_{sw}$). It is to be noted that although in the present case a particular set of circuit parameter values are sensed, it is possible that other embodiments may sense a different set of circuit parameter values.

The inputs include, for example, inputs to respective 10-bit analogue to digital (A/D) converters on-board the controller 306, although it should be appreciated that higher accuracy A/D converters may be used, if required.

In the illustrated embodiment, the controller 306 senses values of the input voltage ($V_{in}$), the output voltage ($V_{out}$), and the voltage ($V_{sw}$) across the synchronous rectifier 304 during a sampling operation synchronised with the deactivation of the turn on pulse for the active switch 302. In other words, in the illustrated example the sampling operation is synchronised with a falling or trailing edge of the first gate signal (PWM_1). In some embodiments, the sampling operation may occur synchronous with each falling or trailing edge of the first gate signal (PWM_1). However, in other embodiments, the sampling operation may occur synchronous with each alternate falling or trailing edges of the first gate signal (PWM_1). Preferably, the sampling operation should not occur less frequently that once every three pulses of the first gate signal.

In the present case, the controller 306 processes at least the sensed values of $V_{in}$, $V_{out}$, and $V_{sw}$ to determine an estimation ($T_{q1est}$) for the first time interval ($T_{q1}$) using an estimation algorithm, and thereafter compares the estimation ($T_{q1est}$) with the current value of the first time interval ($T_{q1}$) to determine the operative mode of the converter 300. In this respect, in the present case the current value of the first time interval ($T_{q1}$) is accessible to the controller 306 because the controller 306 sets and controls that value to regulate the output voltage ($V_{out}$) and thus holds that value in memory. In the present case, the estimation algorithm for the embodiment illustrated in FIG. 3 includes:

$$T_{q1est} = V_{out} \frac{T_{prd}}{V_{in}}$$

Where:
$T_{q1est}$ is the estimation for the first time interval (that is, the "turned on" time for the active switch 304);
$V_{out}$ is the sensed output voltage;
$T_{prd}$ is the period of the first gate signal; and
$V_{in}$ is the sensed input voltage.

It is to be understood that the above estimation algorithm is exemplary. Indeed, it is envisaged that alternative estimation algorithms may be employed which include additional parameters to those listed above.

Determination of the operative mode of the converter 300 based on a comparison of the actual first time interval ($T_{q1}$) with an estimation for the first time interval ($T_{q1est}$) may involve a direct comparison of the estimation for the first time interval (Tq1est) with the actual first time interval ($T_{q1}$). For example, in one embodiment, the controller 306 determines that the converter 300 is operating in discontinuous current mode (DCM) if the actual first time interval ($T_{q1}$) exceeds the estimation for the first time interval ($T_{q1est}$), or alternatively determines the converter 300 is operating in continuous current mode (DCM) if the actual first time interval ($T_{q1}$) is less than the estimation for the first time interval ($T_{q1est}$).

It is not essential that a simple direct comparison of the type described above be employed, and it is possible that other types of comparison may be employed. For example, in another embodiment an offset (that is, a deltaT) is included in the comparison to compensate for potential losses in the converter 300, or possibly to account for inaccuracies in the calculation of $T_{q1est}$ which may arise due to measurement errors. By way of example, $T_{q1}$ may be compared with the sum of $T_{q1est}$ and the offset (deltaT). The offset may be determined empirically through measurements made during operation of the converter 300 or estimated via suitable modeling. It is envisaged that the offset (deltaT) will be about 2% to 5% of the period ($T_{prd}$) of the first gate signal (PWM_1).

Figure 6:
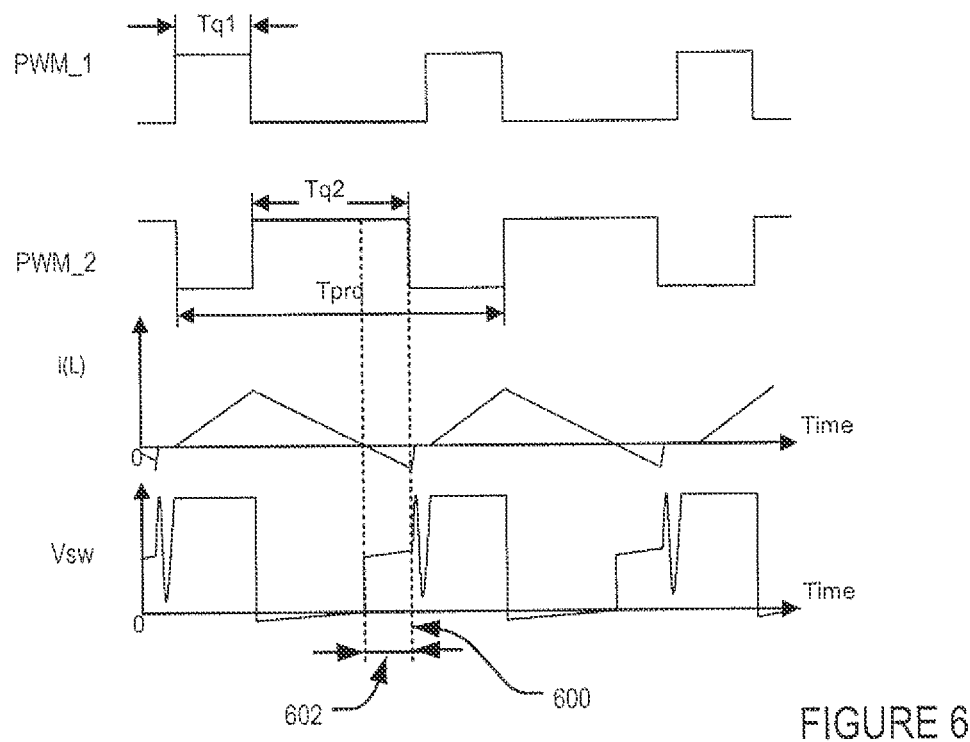
FIG. 6 is another signal timing diagram for the buck converter shown in FIG. 3 when operating in discontinuous current mode (DCM)
Figure 7:
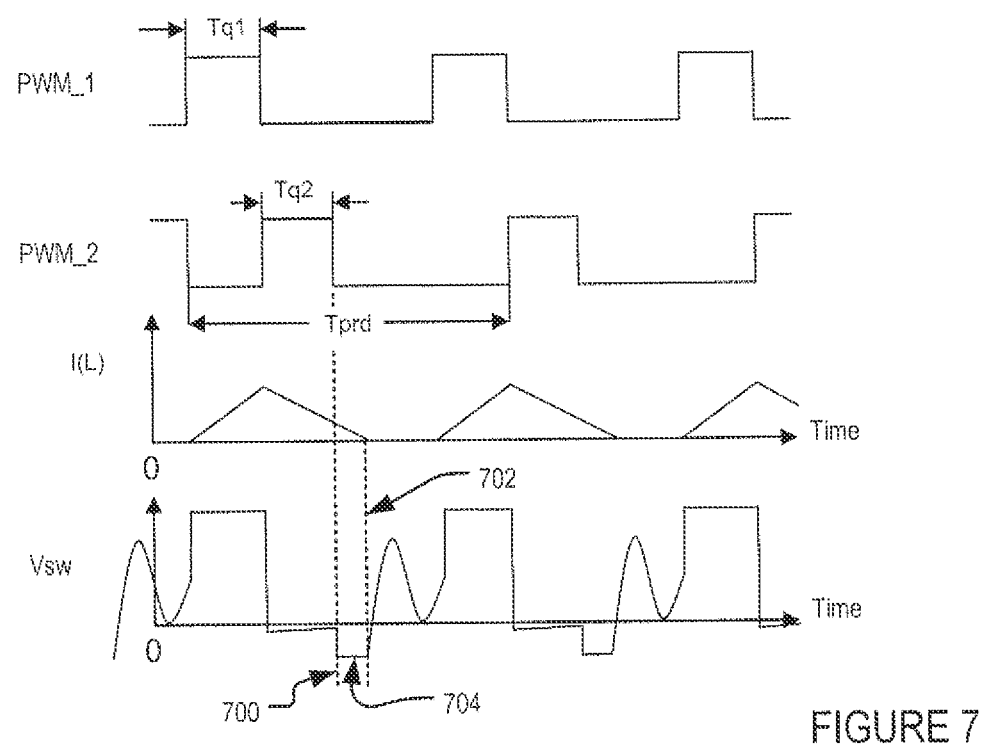
FIG. 7 is another signal timing diagram for the buck converter shown in FIG. 3 when operating in discontinuous current mode (DCM)
Figure 8:
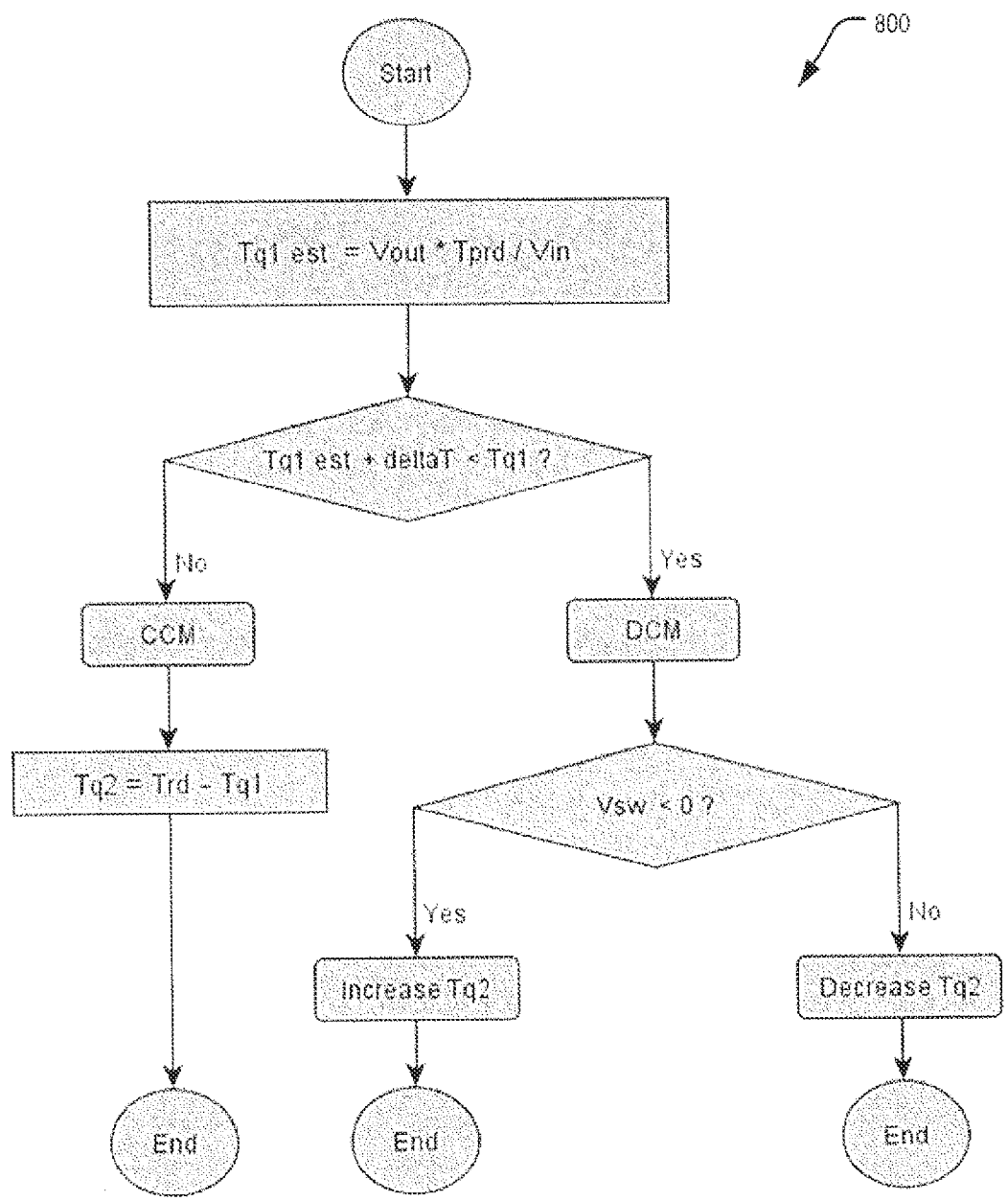
FIG. 8 is a flow diagram of a method of controlling a synchronous buck converter according to an embodiment of the present invention.

With reference to FIGS. 4 to 8, having determined the operative mode of the converter 300, the controller 306 then controls the second time interval ($T_{q2}$) using a control algorithm selected according to the determined operative mode which, as described earlier, will be determined as either CCM or DCM. FIG. 8 shows a flow diagram 800 for an exemplary method of controlling the synchronous converter 300 shown in FIG. 3 prior to and after having determined the operative mode.

Figure 4:
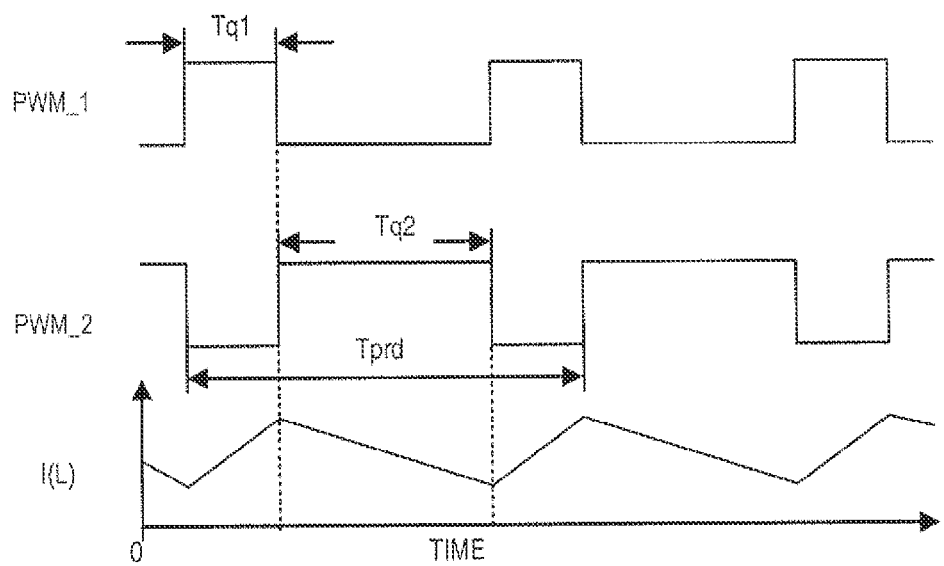
FIG. 4 is a signal timing diagram for the buck converter shown in FIG. 3 when operating in a continuous current mode (CCM)

Referring now to FIG. 4 there is shown a timing diagram showing signal timing relationships for the converter 300 when the operative mode is determined as CCM, meaning that the inductor current I(L) does not decease to zero Amps, and thus is not interrupted. As shown in FIG. 8, if the controller 306 determines that the converter 300 is operating in CCM, the second time interval ($T_{q2}$) is controlled based on the assumption that one of the gates (that is, either the active switch 302 or the synchronous rectifier 304) is always turned on (not including a transition period). In this instance, $T_{q2}$ is determined as follows:

$$T_{q2}=T_{prd}-T_{q1}$$

Where:
  $T_{q2}$ is the "turned on" time (that is, the conduction time) for the synchronous rectifier 304;
  $T_{prd}$ is the period of the first gate signal (PWM_1); and
  $T_{q1}$ is the "turned on" time (that is, the conduction time) for the active switch 302.

Figure 5:
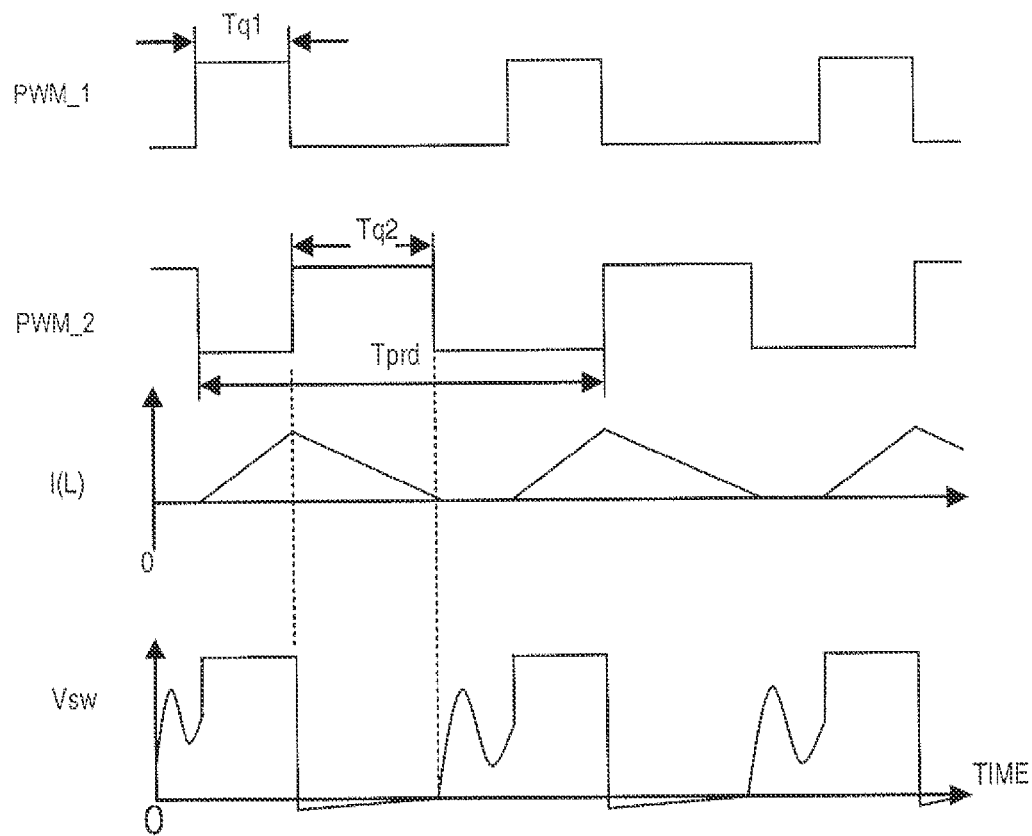
FIG. 5 is a signal timing diagram for the buck converter shown in FIG. 3 when operating in a discontinuous current mode (DCM)

Referring now to FIG. 5 there is shown a signal timing diagram which depicts an optimum or ideal signal timing relationship when the converter 300 (ref. FIG. 3) is operating in DCM. As shown, the timing of the instant at which the inductor current I(L) decreases to zero Amps substantially coincides with the instant at which the synchronous rectifier 304 is turned off, thereby disabling a conduction path which may otherwise permit negative inductor current I(L), which is undesirable. This coinciding timing relationship between the inductor current I(L) and turning off the synchronous rectifier 304 via control of second gate signal (PWM_2) is thus an optimal or ideal relationship for DCM, at least in terms of operating efficiency.

FIGS. 6 and 7 show timing diagrams depicting non-ideal signal timing relationships for the converter 300 when operating in DCM. As will be explained below, the embodiment of the converter 300 illustrated in FIG. 3 operates to correct the non-ideal timing relationship between the second gate signal (PWM_2) and the inductor current I(L) to form signal timing relationships which are similar to those depicted in FIG. 5.

Turning now to the example depicted in FIG. 6, in this example the instant at which the synchronous rectifier 304 is turned off (in other words, each falling edge of PWM_2) occurs later than the instant at which the inductor current I(L) decreases to zero Amps, thereby proving a conduction path which permits negative inductor current I(L). This is in contrast with the example depicted in FIG. 7 in which the instant (ref. dashed line 700) at which the synchronous rectifier 304 is turned off occurs earlier than the instant (ref. dashed line 702) at which the inductor current I(L) decreases to zero Amps. However, as shown in FIG. 7, even though the synchronous rectifier 304 is turned off it nevertheless provides a conduction path due to body diode conduction within the synchronous rectifier 304 which permits inductor current I(L) to flow during period 704.

In the examples shown in FIG. 6 and FIG. 7, it is to be noted in both examples a voltage $V_{sw}$ is present across the synchronous receiver 304 at the instant at which the synchronous rectifier 304 is turned off (ref. FIG. 6 dashed line 600 and FIG. 7 dashed line 700). In the case of FIG. 6, that voltage is higher than the expected voltage (which for the illustrated buck converter is 0V), whereas in FIG. 7 the voltage $V_{sw}$ is close to or below zero Volts (ref. region 704).

According to embodiment of the invention illustrated in FIG. 3, and with reference now to FIG. 8, if the controller 306 determines that the converter 300 is operating in DCM, then the second time interval ($T_{q2}$), being the "turned on" time for the synchronous rectifier 304, is increased or decreased depending on a comparison of the voltage ($V_{sw}$) across the synchronous rectifier 304 with a reference voltage (which in this example is 0V), with the principle being that if $V_{sw}<0V$ the inductor current I(L) is "positive" at the instant when the synchronous rectifier 304 is turned off, in which case $T_{q2}$ is incrementally increased to effectively extend the "turned on" time for the synchronous rectifier 304 by delaying the instant at which the synchronous rectifier 304 is turned off during the next commutation cycle. On the other hand, if $V_{sw}>0V$ the inductor current is "negative" at the instant when the synchronous rectifier 304 is turned off, in which case $T_{q2}$ is incrementally decreased to effectively reduce the "turned on" time for the synchronous rectifier 304 by turning off the synchronous rectifier 304 earlier during the next commutation cycle.

It is to be appreciated that it is not essential that the second time interval ($T_{q2}$) be increased or decreased on the basis of a comparison with the voltage ($V_{sw}$) across the synchronous rectifier 304 since in other embodiments the second time interval ($T_{q2}$) may be increased or decreased based on a comparison involving a sensed value of inductor current I(L). However, it is preferred that the voltage ($V_{sw}$) across the synchronous rectifier 304 ($V_{sw}$) be sensed to avoid the requirement of an additional current sensor.

In view of the above, when the operative mode is determined as DCM, the controller 306 reacts to the voltage ($V_{sw}$) across the synchronous rectifier 304 by dynamically adjusting the duration of the "turned on" or conduction time for the synchronous rectifier 304 to reduce a differential between the timing of the instant at which the synchronous rectifier 304 is turned off and the "zero crossing point" of the inductor current I(L). In other words, the illustrated converter 300 attempts to adjust the timing of the instant at which the synchronous rectifier 304 is turned off by varying the width of $T_{q2}$ so that the instant at which the synchronous rectifier 304 is turned off substantially coincides with the "zero crossing point" of the inductor current, and thus is closer to the ideal signal timing depicted in FIG. 5. In this respect, if $T_{q2}$ is too "long" (as shown in FIG. 6), negative current discharges through the inductor (L) and the load (R) during a period of the time whilst the synchronous rectifier 304 is turned on. As will be appreciated by a skilled reader, energy lost via this discharge path may be calculated by integrating the product of Vsw and I(L) over the period of time 602 (ref. FIG. 6) for which I(L) is negative. On the other hand, if $T_{q2}$ is too "short" (as shown in FIG. 7), then additional losses may occur due to conduction attributable to a body-diode (not shown) within the synchronous rectifier 304 after the synchronous rectifier 304 has been turned off. Hence, in this instance even though synchronous rectifier 304 is nominally turned off, the body diode cannot be switched off and thus still conducts due to a positive voltage bias across the anode to the cathode of the body diode. In this case, the anode of the body diode is connected to the source of the synchronous rectifier 304 FET, whereas the cathode is connected to the drain.

Losses due to body-diode conduction may be calculated as the product of $V_{sw}$ and I(L) during diode conduction. In this respect, as can be seen from the FIG. 7, during body diode conduction (ref. region 704) $V_{sw}$ is substantially larger compared to the voltage immediately prior to the synchronous rectifier 304 being turned off. In terms of a numerical example, during normal conduction (that is, when the synchronous rectifier 304 is turned on) $V_{sw}$ is less than 0.1V, whereas during body diode conduction $V_{sw}$ may be closer to 0.5V, and at high currents reach 1V and higher, thus contributing to a significant reduction in efficiency.

Embodiments of the present invention may reduce inefficiencies arising from the above described body diode conduction or negative current conditions by increasing or decreasing $T_{q2}$ to more closely align turning off of the synchronous rectifier 304 with the instant at which the inductor current I(L) approaches a zero current condition thus reducing the duration for which either negative current or body diode conduction occurs.

Increasing and decreasing $T_{q2}$ may be performed by any suitable algorithm. The amount ($\Delta T_{q2}$) by which $T_{q2}$ is increased or decreased may be a fixed amount (that is, a constant value), or it may be an amount which depends on sensed parameters, such as the magnitude of $V_{sw}$. For example, the amount ($\Delta_{q2}$) by which $T_{q2}$ is increased or decreased may be determined or controlled in accordance with a linear or other mathematical function which depends on the magnitude of $V_{sw}$. Alternatively, the amount by which $T_{q2}$ is increased or decreased may be determined or controlled in accordance with a linear or other mathematical function which depends on a parameter of the first gate control signal (PWM_1), such as the period ($T_{prd}$) of the first gate control signal (PWM_1). By way of example, amount by which $T_{q2}$ is increased or decreased may be determined or controlled as:

$$\Delta T_{q2} = k T_{prd}$$

In one embodiment, k is about 0.01. However, it is possible that k may be between 0.0005 and 0.05.

An advantage of the present invention is that the operative mode of the converter 300 (ref. FIG. 3) may be determined without monitoring or sensing the inductor (L) current or the voltage ($V_{sw}$) across the synchronous rectifier 304 which may otherwise introduce undesirable delays or losses. Indeed, the approach adopted by embodiments of the present invention is in contrast with, and may provide advantages over, prior art approaches which monitor or sense the inductor (L) current to either determine when the polarity of the inductor current reverses (that is, a negative inductor current), or when the inductor current has fallen to zero, or close to zero, and thereby determine when the converter is operating in discontinuous current operative mode. Converters which rely on sensing the inductor current may introduce undesirable signal noise or additional losses due to the need to incorporate additional sensing elements.

Example 2

Synchronous Boost Converter

Figure 9:
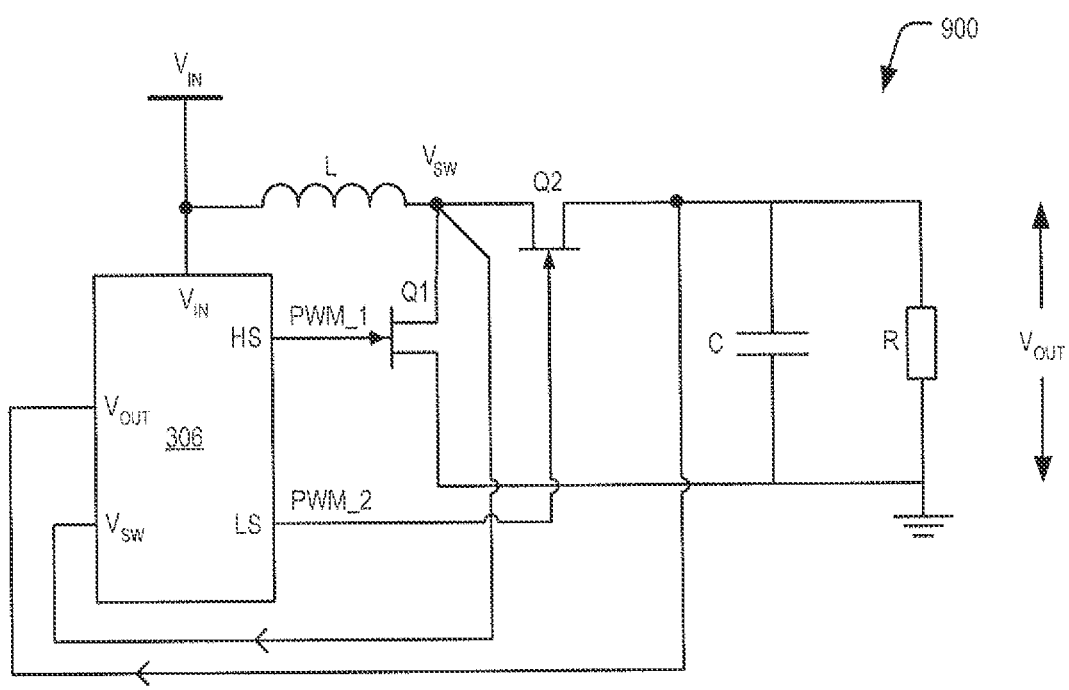
FIG. 9 is a simplified schematic diagram of a synchronous boost converter according to an embodiment of the present invention.

Referring now to FIG. 9 there is shown a simplified schematic diagram of a synchronous DC-DC boost converter 900 according to an embodiment. As will be appreciated, a boost converter accepts an input voltage ($V_{in}$) and produces an output voltage ($V_{out}$) higher than the input voltage.

The converter 900 includes an active switch (labelled as Q1), a synchronous rectifier (labelled as Q2), and a controller 306. The controller 306, active switch Q1 and the synchronous rectifier Q2 are of the same type as the corresponding elements described above in relation to Example 1.

The operation of the converter 900 is similar in principle to the converter 300 described with reference to Example 1 in that it involves controlling the active switch Q1 using a first gate signal (PWM_1) and controlling the synchronous rectifier Q2 using a second gate signal (PWM_2). In the case of the boost converter 900, however, when the active switch Q1 is turned on by PWM_1 (and Q2 is turned off by PWM_2), the input voltage ($V_{in}$) is impressed across the inductor (L) and thus the current I(L) through the inductor (L) linearly increases, consequently increasing the energy stored in the inductor (L). When the active switch Q1 is turned off, current through the inductor (L) continues to flow via the synchronous rectifier Q2 (which is turned on by PWM_2), the capacitor (C) and the load (R). Hence, when Q2 is turned on (and Q1 is turned off) the inductor (L) discharges its stored energy during which time the polarity of voltage across the inductor (L) reverses and thus the capacitor (C) voltage is higher than the input voltage V. When the active switch Q1 is closed (and Q2 is open), the synchronous rectifier Q2 does not conduct and the capacitor (C) maintains the output voltage $V_{out}$ at about the input voltage level V.

As was the case with the converter 300 described above in relation to Example 1, the converter 900 has two operative modes, namely, a continuous current mode (CCM) and a discontinuous current mode (DCM). In discontinuous current mode no current flows through the inductor (L) for part of the commutation cycle. On the other hand, in continuous current mode the current continues to flow through the inductor (L) and varies between a minimum positive value and a maximum positive value.

In the embodiment illustrated in FIG. 9, the controller 306 senses values of the input voltage ($V_{in}$) and the output voltage ($V_{out}$). In this example the controller 306 processes at least the sensed values of $V_{in}$, $V_{out}$ and the current value of $T_{q2}$ to determine the estimation ($T_{q1est}$) for the first time interval ($T_{q1}$) using a different estimation algorithm to that applied in Example 1, and thereafter compares the estimation ($T_{q1est}$) with the current value of the first time interval ($T_{q1}$) to determine the operative mode of the converter 900.

In this respect, in the present case the current values of the first time interval ($T_{q1}$) and the second time interval ($T_{q2}$) are accessible to the controller 306 because the controller 306 sets and controls those values. In the present case, one estimation algorithm for the embodiment illustrated in FIG. 9 includes:

$$T_{q1est} = (V_{in} - V_{out}) \frac{T_{q2}}{V_{in}}$$

Where:

$T_{q1est}$ is the estimation for the first time interval (that is, the "turned on" time for the active switch Q1);

$V_{out}$ is the sensed output voltage;

$T_{q2}$ is second time interval (that is, the "turned on" time for the synchronous rectifier Q2); and $V_{in}$ is the sensed input voltage.

It is to be understood that the above estimation algorithm is exemplary. Indeed, it is envisaged that alternative estimation algorithms may be employed which include additional parameters to those listed above.

In this example, determination of the operative mode of the converter 900 based on a comparison of the actual first time interval ($T_{q1}$) with an estimation for the first time interval ($T_{q1est}$) involves an offset (that is, a deltaT) which is included in the comparison to compensate for potential losses in the converter 900, or possibly to account for inaccuracies in the calculation of $T_{q1est}$, which may arise due to measurement errors. In the present example, $T_{q1}$ is compared with the sum of $T_{q1est}$ and the offset (deltaT). The offset may be determined empirically through measurements made during operation of the converter 900 or estimated via suitable modeling. It is envisaged that the offset will be about 2% to 5% of the period ($T_{prd}$) of the first gate signal.

Figure 12:
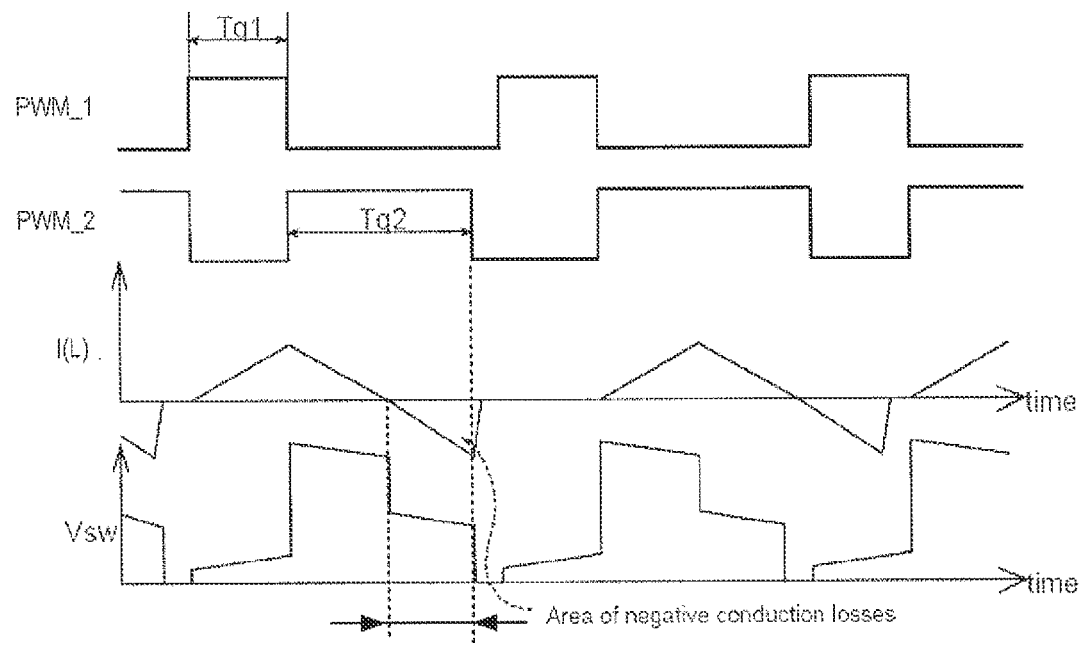
FIG. 12 is another signal timing diagram for the boost converter shown in FIG. 9 when operating in discontinuous current mode (DCM)
Figure 13:
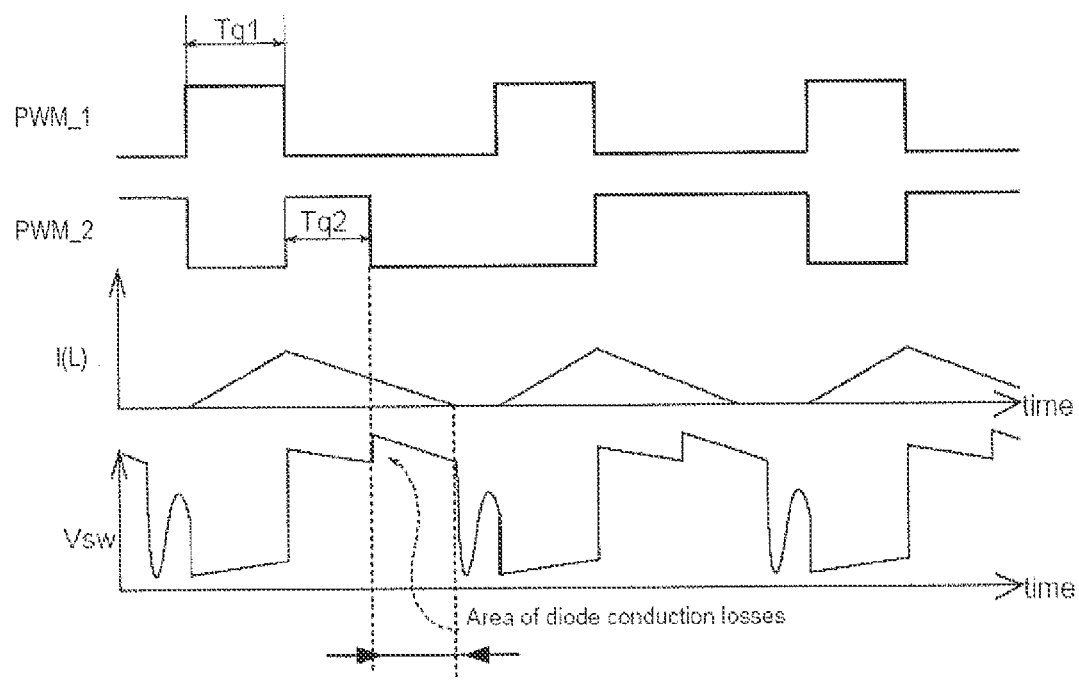
FIG. 13 is another signal timing diagram for the boost converter shown in FIG. 9 when operating in discontinuous current mode (DCM)
Figure 14:
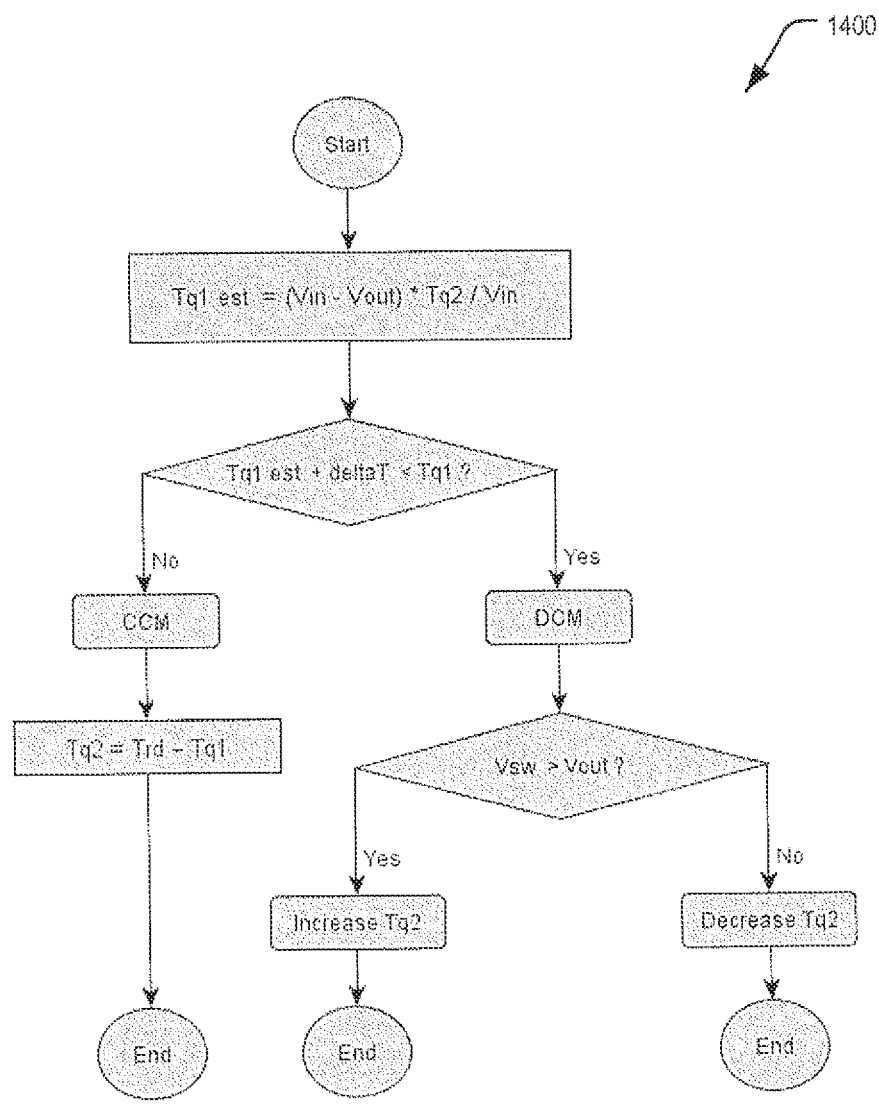
FIG. 14 is a flow diagram of a method of controlling a synchronous boost converter according to an embodiment of the present invention.

With reference now to FIGS. 10 to 14, having determined the operative mode of the converter 900, the controller 306 then controls the second time interval ($T_{q2}$) using a control algorithm selected according to the determined operative mode which, as described earlier, will be determined as either CCM or DCM. FIG. 14 shows a flow diagram 1400 for an exemplary method of controlling the synchronous converter 900 shown in FIG. 9 prior to and after having determined the operative mode.

Figure 10:
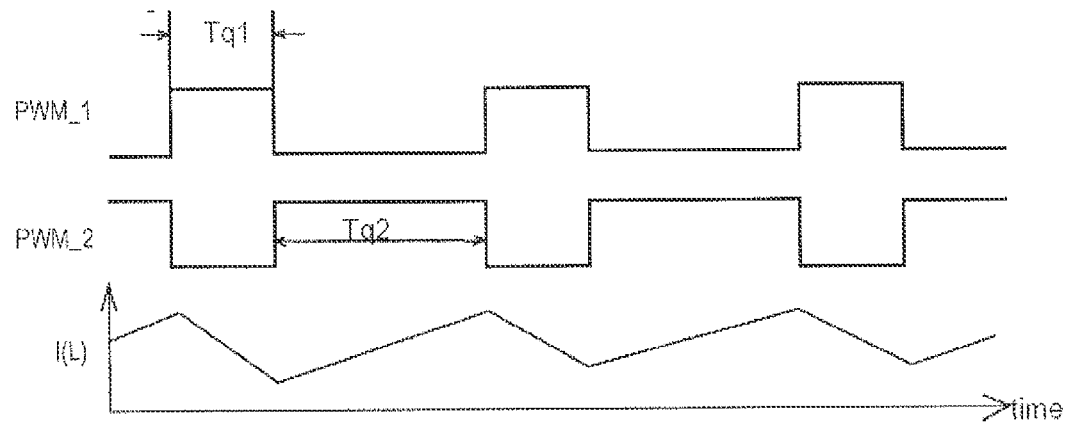
FIG. 10 is a signal timing diagram for the boost converter shown in FIG. 9 when operating in a continuous current mode (CCM)

Referring now to FIG. 10 there is shown a timing diagram showing signal timing relationships for the converter 900 when the operative mode is determined as CCM, meaning that the inductor current I(L) does not decease to zero Amps, and thus is not interrupted. As shown, if the controller 306 determines that the converter 900 is operating in CCM, the second time interval ($T_{q2}$) is controlled based on the assumption that one of the gates (that is, either the active switch 302 or the synchronous rectifier 304) is always turned on (not including a transition period). In this instance $T_{q2}$ is determined as follows:

$$T_{q2} = T_{prd} - T_{q1}$$

Where:

$T_{q2}$ is the "turned on" time for the synchronous rectifier Q2;

$T_{prd}$ is the period of the first gate signal (PWM_1); and $T_{q1}$ is the "turned on" time for the active switch Q1.

Figure 11:
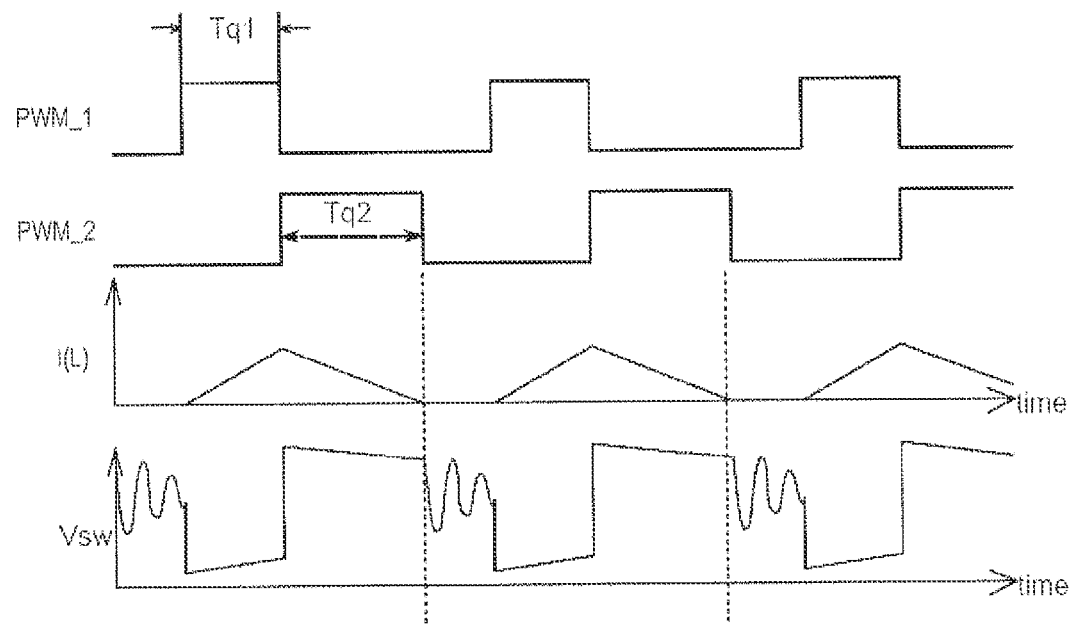
FIG. 11 is a signal timing diagram for the boost converter shown in FIG. 9 when operating in a discontinuous current mode (DCM)

Referring now to FIG. 11 there is shown a signal timing diagram which depicts optimum or ideal signal timing relationships when the converter 900 (ref. FIG. 9) is operating in DCM. As shown, the timing of the instant (shown dashed) at which the inductor current I(L) decreases to zero Amps substantially coincides with the instant at which the synchronous rectifier Q2 is turned off, thereby disabling a conduction path which may otherwise permit negative inductor current, which is undesirable. This coinciding timing relationship between the inductor current I(L) and turning off the synchronous rectifier Q2 via control of second gate signal (PWM_2) thus represents an optimal or ideal relationship for DCM, at least in terms of operating efficiency.

FIGS. 12 and 13 show timing diagrams depicting non-ideal signal timing relationships for the converter 900 when operating in DCM. As will be explained below, the embodiment of the converter 900 illustrated in FIG. 9 operates to correct the non-ideal timing relationship between the signals to form signal timing relationships which are similar to those depicted in FIG. 11.

Turning firstly to the example depicted in FIG. 12, in this example the instant at which the synchronous rectifier Q2 is turned off occurs later than the instant at which the inductor current I(L) decreases to zero Amps, thereby providing a conduction path which permits negative inductor current I(L) for the duration of $T_{q2}$. This is in contrast with the example depicted in FIG. 13 in which the instant at which the synchronous rectifier Q2 is turned off occurs earlier than the instant at which the inductor current I(L) decreases to zero Amps. However, as shown, even though the synchronous rectifier Q2 is turned off it nevertheless provides a conduction path which permits inductor current I(L) to flow through the body diode of the synchronous rectifier Q2.

In the examples shown in FIG. 12 and FIG. 13, it is to be noted that a voltage $V_{sw}$ is present across the synchronous receiver Q2 at the instant at which the synchronous rectifier Q2 is turned off. In the case of FIG. 12, that voltage is less than the output voltage $V_{out}$, whereas in FIG. 13 the voltage $V_{sw}$ exceeds the output voltage $V_{out}$.

According to the embodiment of the invention illustrated in FIG. 9, if the controller 306 determines that the converter 900 is operating in DCM, then the second time interval ($T_{q2}$), being the "turned on" time for the synchronous rectifier Q2, is increased or decreased depending on a comparison of the voltage ($V_{sw}$) across the synchronous rectifier Q2 with the output voltage $V_{out}$, with the principle being that if $V_{sw} > V_{out}$ (as is the case in FIG. 13) the inductor current I(L) is "positive" at the instant that Q2 is turned off, in which case $T_{q2}$ is incrementally increased to effectively increase the conduction time of the synchronous rectifier Q2 by delaying the instant at which the Q2 is turned off during the next commutation cycle. On the other hand, if $V_{sw} < V_{out}$ the inductor current I(L) is "negative" (as is the case in FIG. 12) at the instant Q2 is turned off, in which case $T_{q2}$ is incrementally decreased to effectively reduce the conduction time of the synchronous rectifier Q2 by turning off Q2 earlier during the next commutation cycle.

As was explained in relation to Example 1, it is not essential that the second time interval ($T_{q2}$) be increased or decreased on the basis of a comparison involving the voltage ($V_{sw}$) across the synchronous rectifier Q2 since in other embodiments the second time interval ($T_{q2}$) may be increased or decreased based on a comparison involving a value of sensed inductor current I(L). However, it is preferred that the voltage ($V_{sw}$) across the synchronous rectifier Q2 be sensed to avoid the requirement an additional current sensor.

In view of the above, when the operative mode is determined as DCM, the controller 306 reacts to the voltage ($V_{sw}$) across the synchronous rectifier Q2 by dynamically adjusting the "turned on" time for the synchronous rectifier Q2 so as to reduce a differential between the instant at which the synchronous rectifier Q2 is turned off and the "zero crossing point" of the inductor current I(L). In other words, the illustrated converter 900 attempts to adjust the instant at which the synchronous rectifier Q2 is turned off by varying the width of $T_{q2}$ so that the instant at which the synchronous rectifier Q2 is turned off substantially coincides with the "zero crossing point" of the inductor current I(L). In this respect, if $T_{q2}$ is too "long" (as shown in FIG. 12), negative current discharges through the inductor (L) and load (R) during a period of the time whilst the synchronous rectifier Q2 is turned on. On the other hand, if $T_{q2}$ is too "short" (as shown in FIG. 13), then additional losses may occur due to body diode conduction within the synchronous rectifier Q2 after the synchronous rectifier Q2 has been turned off.

The converter 900 depicted in FIG. 9 may reduce inefficiencies arising from the above described body diode conduction or negative current conditions by increasing or decreasing $T_{q2}$ to more closely align turning off of the synchronous rectifier Q2 with the instant at which the inductor current I(L) approaches a zero current condition thus reducing the duration for which either negative current or body diode conduction occurs.

Increasing and decreasing $T_{q2}$ may be performed by any suitable algorithm. The amount ($\Delta T_{q2}$) by which $T_{q2}$ is increased or decreased may be a fixed amount (that is, a constant value), or it may be an amount which depends on sensed parameters, such as the magnitude of $V_{sw}$. For example, the amount ($\Delta T_{q2}$) by which $T_{q2}$ is increased or decreased may be determined or controlled in accordance with a linear or other mathematical function which depends on the magnitude of $V_{sw}$. Alternatively, the amount by which $T_{q2}$ is increased or decreased may be determined or controlled in accordance with a linear or other mathematical function which depends on a parameter of the first gate control signal (PWM_1), such as the period ($T_{prd}$) of the first gate control signal (PWM_1). By way of example, amount by which $T_{q2}$ is increased or decreased may be determined or controlled as:

$$\Delta T_{q2} = k T_{prd}$$

In one embodiment, k is about 0.01. However, it is possible that k may be between 0.0005 and 0.05.

A person skilled in the art will understand that there may be variations and modifications other than those specifically described. It is to be understood that the invention includes all such variations and modifications. The invention also includes all steps and features referred to, or indicated in this specification, individually or collectively, and any and all combinations of any two or more of the steps or features.

The invention claimed is:

1. A synchronous DC-DC converter for converting an input voltage ($V_{in}$) into an output voltage ($V_{out}$), the converter having a continuous current operative mode (CCM) and a discontinuous current operative mode (DCM), the converter including:
   an active switch receiving a first gate signal for turning on the active switch for a first time interval ($T_{q1}$), the first gate signal having a period ($T_{prd}$);
   a synchronous rectifier receiving a second gate signal for turning on the synchronous rectifier for a second time interval ($T_{q2}$); and
   a controller for determining an estimation ($T_{q1est}$) for the first time interval ($T_{q1}$), and thereafter comparing the estimation ($T_{q1est}$) with the value of the first time interval ($T_{q1}$), wherein comparing the estimation ($T_{q1est}$) with the value of the first time interval ($T_{g1}$) comprises:
   increasing the estimation by an amount (deltaT) attributable to an estimation of losses in the converter; and
   comparing the value of the first time interval (Tq1) with the increased estimation;
   wherein responsive to the comparison the controller determines an operative mode of the converter and controls the second time interval ($T_{q2}$) depending on the determined operative mode, wherein the controller determines the operative mode of the converter to be a continuous current operative mode (CCM) if the value of the first time interval ($T_{q1}$) exceeds the increased estimation, and wherein the controller determines the operative mode of the converter to be a discontinuous current operative mode (DCM) if the value of the first time interval ($T_{q1}$) is less than the increased estimation.

2. A converter according to claim 1, wherein the converter includes a buck converter and the buck converter further includes means for obtaining a value of the input voltage ($V_{in}$), a value of the output voltage ($V_{out}$), and a value of the period ($T_{prd}$), and wherein the estimation ($T_{q1est}$) for the first time interval is determined based on at least the obtained values.

3. A converter according to claim 2, wherein the estimation ($T_{q1est}$) for the first time interval is determined as:

$$T_{q1est} = V_{out} \frac{T_{prd}}{V_{in}}.$$

4. A converter according to claim 1, wherein the converter includes a boost converter and the boost converter further includes means for obtaining a value of the input voltage ($V_{in}$), a value of the output voltage ($V_{out}$), and a value of the second time interval ($T_{q2}$), and wherein the estimation ($T_{q1est}$) for the first time interval is determined based on at least the obtained values.

5. A converter according to claim 4, wherein the estimation ($T_{q1est}$) for the first time interval is determined as:

$$T_{q1est} = (V_{in} - V_{out}) \frac{T_{q2}}{V_{in}}.$$

6. A converter according to claim 1, wherein the amount attributable to an estimation of losses in the converter has a value of about 2% to 5% of the period ($T_{prd}$) of the first gate signal.

7. A converter according to claim 6 further including means for sensing a value of voltage ($V_{sw}$) across the synchronous rectifier, wherein if the controller determines the operative mode as discontinuous current operative mode (DCM) the second time interval ($T_{q2}$) is adjusted according to the polarity of the sensed voltage value ($V_{sw}$).

8. A converter according to claim 7, wherein adjusting the second time interval ($T_{q2}$) includes:
   increasing the second time interval ($T_{q2}$) if the sensed voltage value ($V_{sw}$) has a negative polarity, or
   adjusting the second time interval ($T_{q2}$) includes decreasing the second time interval ($T_{q2}$) if the sensed voltage value ($V_{sw}$) has a positive polarity, or
   adjusting the second time interval ($T_{q2}$) includes increasing the second time interval ($T_{q2}$) if the sensed voltage value ($V_{sw}$) exceeds the output voltage ($V_{out}$), or
   adjusting the second time interval ($T_{q2}$) includes decreasing the second time interval ($T_{q2}$) if the sensed voltage value ($V_{sw}$) is less than the output voltage ($V_{out}$).

9. A converter according to claim 8, wherein the adjustment is about 1% of the period ($T_{prd}$) of the first gate signal.

10. A method of controlling a synchronous converter for converting an input voltage (Vin) into an output voltage ($V_{out}$), the converter having a continuous current operative mode (CCM) and a discontinuous current operative mode (DCM), the converter including an active switch receiving a first gate signal for turning on the active switch for a first time interval ($T_{q1}$), the first gate signal having a period ($T_{prd}$), and a synchronous rectifier receiving a second gate signal for turning on the synchronous rectifier for a second time interval ($T_{q2}$), the method including:

determining an estimation ($T_{q1est}$) for the first time interval;

comparing the estimation ($T_{qlest}$) with the value of the first time interval ($T_{q1}$) wherein comparing the estimation ($T_{q1est}$) with the value of the first time interval ($T_{q1}$) comprises:

increasing the estimation by an amount (deltaT) attributable to an estimation of losses in the converter; and comparing the value of the first time interval (Tq1) with the increased estimation;

determining an operative mode of the converter depending on the comparison, wherein the controller determines the operative mode of the converter to be a continuous current operative mode (CCM) if the value of the first time interval ($T_{q1}$) exceeds the increased estimation, and wherein the controller determines the operative mode of the converter to be a discontinuous current operative mode (DCM) if the value of the first time interval ($T_{q1}$) is less than the increased estimation; and controlling the second time interval ($T_{q2}$) depending on the determined operative mode.

11. A method according to claim 10, wherein the converter includes a buck converter and wherein the method further includes:

obtaining a value of the input voltage (Vin), a value of the output voltage (Vout), and a value of the period ($T_{prd}$); and determining the estimation ($T_{q1est}$) for the first time interval based on at least the obtained values.

12. A method according to claim 11, wherein the estimation ($T_{q1est}$) for the first time interval is determined as:

$$T_{q1est} = V_{out} \frac{T_{prd}}{V_{in}}.$$

13. A method according to claim 10, further including:

obtaining the value of the input voltage ($V_{in}$), the value of the output voltage (Vout), and the value of the second time interval ($T_{q2}$); and determining the estimation ($T_{q1est}$) for the first time interval based on at least the obtained values.

14. A method according to claim 13, wherein the estimation ($T_{q1est}$) for the first time interval is determined as:

$$T_{q1est} = (V_{in} - V_{out}) \frac{T_{q2}}{V_{in}}.$$

15. A method according to claim 10, wherein the amount attributable to an estimation of losses in the converter has a value of about 2% to 5% of the period ($T_{prd}$) of the first gate signal.

16. A method according to claim 10, wherein adjusting the second time interval ($T_{q2}$) includes:

increasing the second time interval ($T_{q2}$) if the sensed voltage value ($V_{sw}$) has a negative polarity, or adjusting the second time interval ($T_{q2}$) includes decreasing the second time interval ($T_{q2}$) if the sensed voltage value ($V_{sw}$) has a positive polarity or adjusting the second time interval ($T_{q2}$) includes increasing the second time interval ($T_{q2}$) if the sensed voltage value ($V_{sw}$) exceeds the output voltage ($V_{out}$), or adjusting the second time interval ($T_{q2}$) includes decreasing the second time interval ($T_{q2}$) if the sensed voltage value ($V_{sw}$) is less than the output voltage ($V_{out}$).

17. A method according to claim 16, wherein the adjustment is about 1% of the period ($T_{prd}$) of the first gate signal.

18. A method according to claim 10 further including:

sensing a value of voltage ($V_{sw}$) across the synchronous rectifier; and if the operative mode is determined as discontinuous current operative mode (DCM), adjusting the second time interval ($T_{q2}$) according to the polarity of the sensed voltage value ($V_{sw}$).

19. A controller for a synchronous DC-DC converter for converting an input voltage (Vin) into an output voltage (Vout), the converter having a continuous current operative mode (CCM) and a discontinuous current operative mode (DCM), the converter including an active switch and a synchronous rectifier, the controller including:

a first output providing a gate signal for turning on the active switch for a first time interval ($T_{q1}$), the first gate signal having a period ($T_{prd}$);

a second output providing a second gate signal for turning on the synchronous rectifier for a second time interval ($T_{q2}$);

an input for receiving a sensed value of voltage ($V_{sw}$) across the synchronous rectifier; and a processing unit for determining an estimation ($T_{q1est}$) for the first time interval and comparing the estimation ($T_{q1est}$) with the value of the first time interval ($T_{q1}$), wherein comparing the estimation ($T_{q1est}$) with the value of the first time interval ($T_{q1}$) comprises:

increasing the estimation by an amount (deltaT) attributable to an estimation of losses in the converter; and comparing the value of the first time interval (Tq1) with the increased estimation;

wherein responsive to the comparison the processing unit determines an operative mode of the converter and controls the second time interval ($T_{q2}$) depending on the determined operative mode, wherein the controller determines the operative mode of the converter to be a continuous current operative mode (CCM) if the value of the first time interval ($T_{q1}$) exceeds the increased estimation, and wherein the controller determines the operative mode of the converter to be a discontinuous current operative mode (DCM) if the value of the first time interval ($T_{q1}$) is less than the increased estimation.

20. A controller according to claim 19, wherein if the controller determines the operative mode as discontinuous current operative mode (DCM) the second time interval ($T_{q2}$) is adjusted according to the polarity of the sensed voltage value ($V_{sw}$).

* * * * *